Sept. 2, 1969 G. P. WECKLER 3,465,293

DETECTOR ARRAY CONTROLLING MOS TRANSISTOR MATRIX

Filed March 11, 1966

INVENTOR.
GENE P. WECKLER
BY Samuel Lindenberg
Robert Brown
ATTORNEYS 3,465,293

DETECTOR ARRAY CONTROLLING MOS TRANSISTOR MATRIX

Gene P. Weckler, Campbell, Calif., assignor to Fairchild Camera and Instrument Corporation, Syosset, N.Y., a corporation of Delaware Filed Mar. 11, 1966, Ser. No. 533,635
Int. Cl. H04g *1/04*
U.S. Cl. 340—166 4 Claims This invention relates to detector or sensor arrays, and more particularly to improvements in scanning or sampling such arrays.

Figures 1, 2:
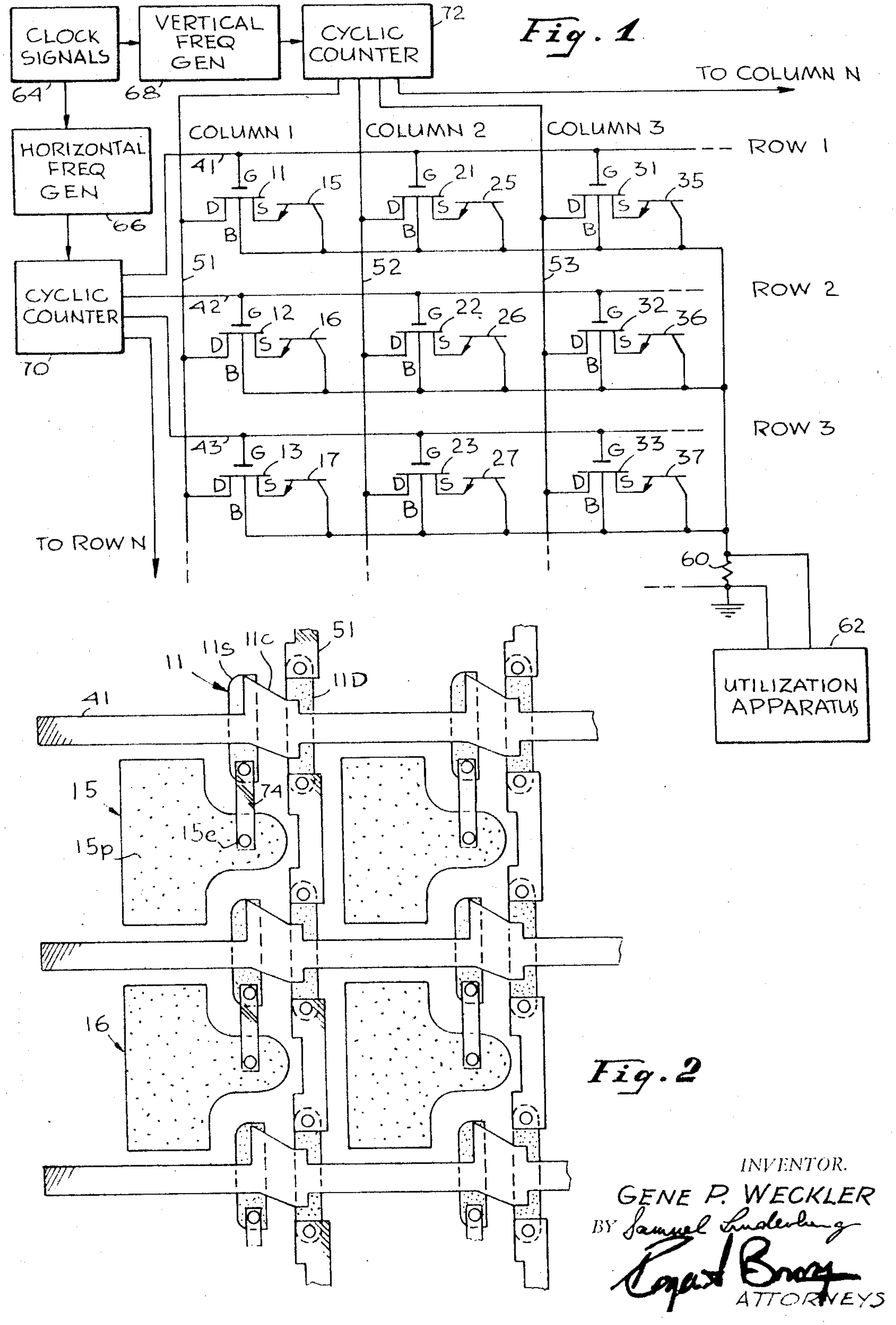

Detector arrays, such as photodetector arrays, have been constructed for the purpose of enabling image dissection by addressing each photodetector and determining the amplitude of the signal which it produces as an output. The problems that have been presented are not so much with the arrangement of the photodetectors in an array, but in the apparatus for sampling the photodetectors.

An object of this invention is the provision of a novel, simple, stable, and reliable apparatus for selectively sampling the photodetectors in an array of photodetectors which lends itself to integrated circuit techniques.

Effectively, the objects of the invention are accomplished by providing a first array of a plurality of detecting devices arranged in rows and columns, a second array of a plurality of metal-oxide semiconductor (MOS) transistors arranged in a corresponding number of rows and columns, there being an MOS transistor for each detecting device. Means are provided for selectively applying energizing potentials to a predetermined row and column of MOS transistors to render operative the one at the intersection of the predetermined row and column. Means are provided for coupling each of the detecting devices in the first array in a corresponding row and column to an MOS transistor in a corresponding row and column in the second array for energizing a detecting device connected to an energized MOS transistor. Means are provided for deriving an output from an energized detecting device.

The above system is constructed by integrating with each detector in an array an MOS transistor having a gate electrode, a bulk electrode, and a pair of electrodes, one being a source and the other a drain. They are interconnected so that when a row and a column are energized, the detector at the intersection of the excited row and column has its signal sampled. The purpose of the MOS transistor is to perform an "And" function when row and column coincidence occur and thus enable sampling.

The novel features that are considered characteristic of this invention are set forth with particularity in the appended claims. The invention will best be understood from the following description when read in connection with the accompanying drawings, in which:

FIGURE 1 is a schematic circuit diagram of a detector array in accordance with this invention; and FIGURE 2 is a schematic illustration of an arrangement of a photodetector and sampling structure array, in accordance with this invention, as it would appear using integrated circuit techniques.

In the array shown in FIGURE 1, the MOS transistors in column 1 respectively are designated by reference numerals 11, 12, 13. In the second column, the MOS transistors are designated by reference numerals 21, 22, 23, respectively. The MOS transistors in the third column are designated by reference numerals 31, 32, 33, respectively. Associated with each one of the MOS transistors in the first column is a photodetector respectively 15, 16, 17. Associated with each MOS transistor in the second column is a photodetector respectively 25, 26, 27. Associated with each MOS transistor in the third column is a photodetector respectively 35, 36, 37.

The photodetectors may be either a two layer structure (i.e., a photodiode) or a three layer structure (i.e. a phototransistor as illustrated herein). An added advantage of a three layer structure is that by proper choice in sample time and scan time, it is possible to operate the detectors in a storage mode, obtaining the advantages of this mode of operation, which is employed in television cameras.

A row bus 41 connects all the gate electrodes of all of the MOS transistors 11, 21, 31 together, so that upon the application to this row bus of a voltage which exceeds a predetermined threshold voltage for the MOS transistors, all of the MOS transistors 11, 21, 31 will be rendered operative. By operative it is meant that the device conducts current readily between source and drain. It should be noted at this point that the gate electrodes of the MOS transistors are designated by a G, the source electrodes are designated by an S, the drain electrodes are designated by a D, and the bulk electrodes are designated by a B.

A second row bus 42 connects together all of the gate electrodes of the MOS transistor 12, 22, 32. The application of a voltage to row bus 42 which exceeds a predetermined voltage will turn on all of the MOS transistors 12, 22, 32. A row bus 43 connects together all the gate electrodes of MOS transistors 13, 23 and 33. The application of a voltage to bus 43 which exceeds the threshold of the three MOS transistors will render them operative.

A first column bus 51 is provided to which are connected all of the drain electrodes, designated as D, of the respective MOS transistors 11, 12 and 13. A second column bus 52 is connected to all of the drain electrodes of the MOS transistors 21, 22 and 23. A third column bus 53 connects together all of the drain electrodes of the MOS transistors 31, 32 and 33. The emitter of each of the photodetectors, for example 15, is connected to the source electrode of its associated MOS transistor, for example 11. The bulk electrode of each of the MOS transistors is connected to the collector of each one of the associated photodetectors and these are all connected to a common load 60. Across the common load is connected the utilization apparatus 62. It should be appreciated, that instead of a common load, if desired, a separate load may be used for each row which is scanned, or for each combined MOS transistor and photodetector which is addressed. The reason a common load is shown is to illustrate how the device may be utilized to generate a train of video signals analogous to the output of a television camera.

For the purpose of scanning the photodetector array shown, a source of clock signals 64 applies them to a horizontal frequency generator 66, and a vertical frequency generator 68. These respective horizontal and vertical frequency generators constitute dividers which divide down the clock signal to a desired horizontal and vertical scanning frequency. The output of the horizontal frequency generator comprises signals for scanning the rows which are applied to a cyclic counter 70. Each count output of the counter is applied to excite the respective row buses 41, 42 and 43. The output of the vertical frequency generator is applied to the cyclic counter 72 which serves to distribute the vertical frequency signals to the respective column buses 51, 52 and 53.

Assume now that the array of photodetectors is exposed to a scene for which it is desired to generate video signals. Upon the application of a scanning signal to both the cyclic counters energizing row bus 41 and column 51, current can flow from the source through the drain of MOS device 11 and through the photodetector 15 down through the load resistor 60. The amplitude of this current will vary with the excitation of the photodetector 15 which, of course, varies with the amplitude of the light to which it is exposed. While maintaining the row bus 41 energized, the cyclic counter 72 energizes the second column bus 52 whereby the current that is caused to flow through the load 60 represents the light intensity upon photodetector 25 instead of the photodetector 15. It will be understood from the foregoing how each one of the columns is energized in turn while the energization is maintained for each row, whereby the scanning action of the photodetectors is effected. A sequence of voltages is generated across the load resistor 60 which represents the scene to which the photodetectors are exposed. The utilization apparatus 62 may be either a display device or any other suitable device for processing the video signal waveform which is generated by the circuitry shown in FIGURE 1. It should be noted that while sequential selection of rows and columns is described, selection does not necessarily have to be sequential. Selection may be done in any desired sequence. This invention therefore presents a simple arrangement for embodying the image which is being presented to the array.

FIGURE 2 illustrates, by way of example, an integrated circuit arrangement for the embodiment of the invention. Each photodetector, such as photodetector 15, has the spade-shaped appearance in which there is a p-type base 15*p* and an n-type emitter, 15*e*. The row buses, such as 41, are deposited (the process is explained in U.S. Patent No. 2,981,877). The MOS transistor 11 has a source 11S, a channel region 11C, and a drain 11D. The portion of bus 41 deposited over the channel region constitutes the gate. It is insulated from the source and the drain by an oxide layer, not shown. The emitter 15*e* of the photodetector is connected to the source of the MOS transistor by a deposited conductor 74. Contact is made to the emitter 15*e* and to the source 11S through holes in the oxide (not illustrated) as is well known in the art. The drain of each MOS transistor is connected in the same way to the column bus, for example 51, of the array. The arrangement shown in FIGURE 2 may be obtained using well-known integrated circuit techniques.

There has accordingly been described and shown herein a novel, useful and unique arrangement for enabling an array of photoconductors to be scanned. It will be appreciated that while the array is shown for scanning photodetectors, any other two terminal variable impedance device may be used in place of the photodetectors with the array of MOS transistors. Thus, for example, devices such as thermistors may be used whose resistance varies with their temperature. These may be substituted in place of the photodetectors and a video signal may be generated by scanning the array representative of the heat image of the area scanned.

What is claimed is:

1. A system comprising a first array of a plurality of detecting devices arranged in rows and columns, a second array of a plurality of MOS transistors arranged in a corresponding number of rows and columns, there being an MOS transistor for each detecting device, means for selectively applying energizing potentials to a predetermined row and column of MOS transistors to render operative the MOS transistor at the intersection of the predetermined row and column, means coupling each of said plurality of detecting devices in said first array to an MOS transistor in a corresponding row and column in said second array for energizing a detecting device connected to an energized MOS transistor, and means for deriving an output from an energized detecting device.

2. A system for scanning a plurality of variable impedance devices which are disposed in an array of rows and columns, said system comprising an MOS transistor for each one of said devices, said MOS transistor also being disposed in an array of columns and rows, each one of said MOS transistors having a gate electrode, a bulk electrode, and a pair of electrodes one being a source and the other a drain, means for connecting each one of said variable impedance devices between said bulk electrode and one of said pair of electrodes, a separate row bus associated with each row in said MOS array, a separate column bus associated with each column in said MOS array, means connecting each gate electrode of each of the MOS transistors in a row to the associated row bus, means connecting said drain electrodes of each of the MOS transistors in a column to the associated column bus, means for selectively exciting said row and column buses whereby the MOS transistor at the intersection of a selectively excited row and column bus is energized, and means for deriving an output from an energized MOS transistor representative of the impedance of the variable impedance connected thereto.

3. Apparatus as recited in claim 1 wherein said variable impedance devices each comprise a photodetector.

4. A video signal generator comprising a plurality of MOS transistors disposed in an array of rows and columns, each MOS transistor having a gate electrode, a bulk electrode, and a pair of electrodes, one being a drain electrode and the other a source electrode, a column bus for each one of the columns of said MOS transistors in said array, a row bus for each one of the rows of said MOS transistors in said array, means connecting each gate electrode of each MOS transistor in a row with the row bus associated with that row, means connecting the drain electrode of each MOS transistor in a column with the column bus associated with that column, a plurality of photodetectors, there being a photodetector provided for each of said plurality of MOS transistors, an output impedance, means connecting each bulk electrode of said plurality of MOS transistors to said output impedance, means connecting each photodetector between the source electrode of a separate one of said plurality of MOS transistors and said impedance, and means for selectively exciting said column and row buses to enable an output to be established across said impedance in accordance with the output of a photodetector connected to an MOS transistor which is at the junction of the excited column and row buses.

References Cited

UNITED STATES PATENTS 3,392,373 7/1968 Rouzier ............ 340—166

JOHN W. CALDWELL, Primary Examiner

HAROLD I. PITTS, Assistant Examiner

U.S. Cl. X.R.

250—215; 307—251; 340—147, 228